United States Patent
Wei et al.

(10) Patent No.: US 11,489,945 B2
(45) Date of Patent: Nov. 1, 2022

(54) TCP PACKET PROCESSING METHOD, TOE COMPONENT, AND NETWORK DEVICE

(71) Applicant: Huawei Technologies Co., Ltd., Shenzhen (CN)

(72) Inventors: Qikun Wei, Nanjing (CN); Mingli Zhang, Nanjing (CN); Yanfei Han, Nanjing (CN); Hongbo Zhao, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/213,582

(22) Filed: Mar. 26, 2021

(65) Prior Publication Data

US 2021/0218831 A1 Jul. 15, 2021

Related U.S. Application Data

(63) Continuation of application No. PCT/CN2019/104721, filed on Sep. 6, 2019.

(30) Foreign Application Priority Data

Sep. 27, 2018 (CN) .......................... 201811134308.X (51) Int. Cl.
*H04L 12/00* (2006.01)
*H04L 69/163* (2022.01)
(Continued)

(52) U.S. Cl.
CPC .......... *H04L 69/163* (2013.01); *H04L 69/162* (2013.01); *H04L 69/166* (2013.01); *H04L 69/22* (2013.01)

(58) Field of Classification Search
CPC . H04L 49/9015; H04L 49/901; H04L 47/193; H04L 69/12; H04L 69/22; H04L 69/166; H04L 69/162; H04L 69/163
(Continued)

(56) References Cited

U.S. PATENT DOCUMENTS 7,275,152 B2 * 9/2007 Goud .................... G06F 9/4416
                                                           709/215
7,475,167 B2 * 1/2009 Wunderlich ........ H04L 67/1097
                                                           709/227
(Continued)

FOREIGN PATENT DOCUMENTS

CN          1747444 A        3/2006
CN      103546424 A    *    1/2014     ............. H04L 47/12
(Continued)

*Primary Examiner* — Frantz Coby
(74) *Attorney, Agent, or Firm* — Conley Rose, P.C.

(57) ABSTRACT

A TOE component obtains a first storage address, where the first storage address is an address of a first storage block in a memory, the first storage block stores a target TCP packet, and the target TCP packet includes a packet header and a TCP payload. The TOE component obtains the packet header from the first storage block based on the first storage address. The TOE component performs TCP-related protocol processing based on the packet header, where the TCP payload is not read out of the first storage block by the TOE component when the TOE component performs TCP-related protocol processing based on the packet header.

20 Claims, 8 Drawing Sheets

(51) Int. Cl.
*H04L 69/16* (2022.01)
*H04L 69/166* (2022.01)
*H04L 69/22* (2022.01)

(58) Field of Classification Search
USPC .................................................. 709/230–232
See application file for complete search history.

(56) References Cited

U.S. PATENT DOCUMENTS

| | | |
|---|---|---|
| 7,523,179 B1 | 4/2009 | Chu et al. |
| 8,006,297 B2 * | 8/2011 | Johnson .................. H04L 63/02 |
| | | 713/153 |
| 8,028,071 B1 * | 9/2011 | Mahalingam ....... G06F 9/45558 |
| | | 718/1 |
| 8,194,667 B2 * | 6/2012 | Belgaied ............ H04L 49/9063 |
| | | 370/392 |
| 8,316,276 B2 * | 11/2012 | Aizman .................. H04L 69/16 |
| | | 714/758 |
| 9,286,225 B2 * | 3/2016 | Mehrotra ............ G06F 12/0866 |
| 11,171,936 B2 * | 11/2021 | Zhang ................. H04L 63/0485 |
| 2004/0133713 A1 | 7/2004 | Elzur |
| 2005/0060538 A1 * | 3/2005 | Beverly .................... H04L 9/00 |
| | | 713/160 |
| 2005/0226238 A1 | 10/2005 | Hoskote et al. |
| 2006/0056435 A1 | 3/2006 | Biran et al. |
| 2006/0104303 A1 | 5/2006 | Makineni et al. |
| 2008/0133798 A1 | 6/2008 | Park et al. |
| 2008/0141009 A1 | 6/2008 | Minami et al. |
| 2010/0162382 A1 * | 6/2010 | Kim ........................ H04L 43/18 |
| | | 726/13 |
| 2010/0250783 A1 | 9/2010 | Elzur et al. |
| 2014/0185623 A1 * | 7/2014 | Yam ........................ H04L 67/10 |
| | | 370/401 |
| 2015/0127849 A1 | 5/2015 | Luo et al. |

FOREIGN PATENT DOCUMENTS

| | | | |
|---|---|---|---|
| CN | 103546424 A | | 1/2014 |
| CN | 106034084 A | | 10/2016 |
| CN | 106330788 A | | 1/2017 |
| CN | 106789708 A | * | 5/2017 |
| CN | 106789708 A | | 5/2017 |
| EP | 2543201 A2 | | 1/2013 |
| WO | 2005101767 A1 | | 10/2005 |
| WO | 2005104486 A1 | | 11/2005 |
| WO | 2011108844 A2 | | 9/2011 |

* cited by examiner

TCP PACKET PROCESSING METHOD, TOE COMPONENT, AND NETWORK DEVICE

CROSS-REFERENCE TO RELATED APPLICATIONS

This is a continuation of Int'l Patent App. No. PCT/CN2019/104721, filed on Sep. 6, 2019, which claims priority to Chinese Patent App. No. 201811134308.X, filed on Sep. 27, 2018, which are incorporated by reference.

FIELD

This disclosure relates to the field of computer communication, and in particular, to a Transmission Control Protocol (TCP) packet processing method, a TCP offload engine (TOE) component, and a network device.

BACKGROUND

Currently, TCP traffic accounts for 90% of the total Internet traffic. When a network device processes a TCP packet using a software protocol stack, a large quantity of central processing unit (CPU) resources are consumed.

To improve efficiency of processing TCP packets, the TOE technology is introduced. The TOE technology processes the TCP/IP protocol stack using dedicated hardware, thereby greatly reducing a processing load of the CPU. A dedicated hardware circuit that processes the TCP/IP protocol stack is referred to as a TOE component.

SUMMARY

This disclosure provides a TCP packet processing method, a TOE component, and a chip including the TOE component, and a network device including the TOE component, so as to improve efficiency of processing TCP packets.

A first aspect provides a TCP packet processing method. The TCP offload engine TOE component obtains a first storage address, where the first storage address is an address of a first storage block in a memory, the first storage block stores a target TCP packet, and the target TCP packet includes a packet header and a TCP payload. The TOE component obtains the packet header from the first storage block based on the first storage address. The TOE component performs TCP-related protocol processing based on the packet header; and the TCP payload is not read out of the first storage block by the TOE component when the TOE component performs TCP-related protocol processing based on the packet header.

When the TOE component performs TCP-related protocol processing based on a packet header of a target TCP packet, a TCP payload of the TCP packet does not need to be read out of a first storage block in which the target TCP packet is stored, thereby avoiding a problem of inefficiency caused by frequently reading the target TCP packet during processing of the target TCP packet. In addition, when the TCP-related protocol processing is performed based on the packet header of the target TCP packet, the TCP payload of the TCP packet does not need to be read from the first storage block in which the target TCP packet is stored, and no separate TCP buffer needs to be allocated to different TCP threads, thereby saving storage resources of the memory.

In an implementation, the TOE component further sends a second storage address to the central processing unit CPU, where the second storage address is the first storage address; or the second storage address indicates a second storage block, the second storage block is a start block of at least one storage block, and the at least one storage block includes the first storage block.

In this implementation, the TOE component sends the second storage address to the CPU, so that the CPU can determine to-be-sent data based on the second storage address, thereby avoiding a waste of interface resources between the TOE component and the CPU caused by directly sending of a TCP packet or a TCP payload to the CPU.

In an implementation, after obtaining storage addresses of a plurality of TCP packets of a data flow to which the target TCP packet belongs, the TOE component generates a storage chain based on the storage addresses of the plurality of TCP packets, where the second storage address is an address of a start block of the storage chain.

In this implementation, the TOE component generates the storage chain based on the storage addresses of the plurality of TCP packets, and sends the address of the start block of the storage chain to the CPU. In this way, the TOE component can send the storage addresses of the plurality of TCP packets to the CPU at a time, thereby further saving the interface resources between the TOE component and the CPU and improving the processing efficiency.

Further, the TOE component receives a third storage address sent by the CPU, where the third storage address indicates a storage block in which the to-be-sent data determined by the CPU is stored, and the to-be-sent data includes the TCP payload. The TOE component obtains the to-be-sent data based on the third storage address, and a storage location of the to-be-sent data in the memory does not change before the to-be-sent data is successfully sent.

In this implementation, the to-be-sent data includes the TCP payload of the target TCP packet, and the storage location of the to-be-sent data in the memory does not change before the to-be-sent data is successfully sent. This indicates that in this implementation, only one storage block needs to be allocated to the TCP packet when the TCP packet is processed. Therefore, this implementation saves the storage space of the memory.

In another implementation, the TOE component receives a third storage address sent by a central processing unit CPU, where the third storage address indicates a storage block in which the to-be-sent data determined by the CPU is stored. The TOE component obtains the to-be-sent data based on the third storage address; and a storage location of the to-be-sent data in the memory does not change before the to-be-sent data is successfully sent.

In this implementation, the to-be-sent data sent by the CPU does not include the TCP payload of the target TCP packet. Before the to-be-sent data is successfully sent, the location of the to-be-sent data in the memory does not change, that is, the to-be-sent data can be sent without allocating an additional sending buffer to the to-be-sent data, thereby saving resources of the memory.

A second aspect provides a Transmission Control Protocol offload engine TOE component, where the TOE component includes an interface and a processor. The processor obtains a first storage address through the interface, where the first storage address is an address of a first storage block in a memory, the first storage block stores a target TCP packet, and the target TCP packet includes a packet header and a TCP payload. The processor obtains the packet header from the first storage block based on the first storage address, and performs TCP-related protocol processing based on the packet header; and the TCP payload is not read out of the first storage block by the TOE component when the processor performs TCP-related protocol processing based on the packet header.

In an implementation, the processor is further configured to send a second storage address to the central processing unit CPU through the interface, where the second storage address is the first storage address; or the second storage address indicates a second storage block, the second storage block is a start block of at least one storage block, and the at least one storage block includes the first storage block.

In an implementation, after obtaining storage addresses of a plurality of TCP packets of a data flow to which the target TCP packet belongs, the processor generates a storage chain based on the storage addresses of the plurality of TCP packets, where the second storage address is an address of a start block of the storage chain.

In an implementation, the processor further receives, through the interface, a third storage address sent by the CPU, where the third storage address indicates a storage block in which to-be-sent data determined by the CPU is stored, and the to-be-sent data includes the TCP payload. The processor further obtains the to-be-sent data based on the third storage address, and the storage location of the to-be-sent data in the memory does not change before the to-be-sent data is successfully sent.

In an implementation, the processor further receives, through the interface, a third storage address sent by the central processing unit CPU, where the third storage address indicates a storage block in which the to-be-sent data determined by the CPU is stored. The processor obtains the to-be-sent data based on the third storage address; and storage location of the to-be-sent data in the memory does not change before the to-be-sent data is successfully sent.

A third aspect provides a chip, where the chip includes the TOE component according to the second aspect or any implementation of the second aspect and a network processor. The chip may further include another component.

A fourth aspect provides a network device, where the network device includes the chip according to the third aspect and a central processing unit CPU.

A fifth aspect provides another network device, including a Transmission Control Protocol offload engine TOE component and a memory. The memory stores Transmission Control Protocol TCP packets. The TOE component obtains a first storage address, where the first storage address is an address of a first storage block in the memory, the first storage block stores a target TCP packet, and the target TCP packet includes a packet header and a TCP payload. The TOE component further obtains the packet header from the first storage block based on the first storage address, and performs TCP-related protocol processing based on the packet header; and the TCP payload is not read out of the first storage block by the TOE component when the TOE component performs TCP-related protocol processing based on the packet header.

In an implementation, the network device further includes a central processing unit CPU. The TOE component further sends a second storage address to the CPU, where the second storage address is the first storage address; or the second storage address indicates a second storage block, the second storage block is a start block of at least one storage block, and the at least one storage block includes the first storage block. The CPU receives the second storage address, and determines to-be-sent data and a third storage address based on the second storage address, where the third storage address indicates a storage block in which the to-be-sent data is stored, and the to-be-sent data includes the TCP payload.

Further, after obtaining storage addresses of a plurality of TCP packets of a data flow to which the target TCP packet belongs, the TOE component generates a storage chain based on the storage addresses of the plurality of TCP packets, where the second storage address is an address of a start block of the storage chain.

Further, the CPU runs a socket, and the TOE component sends the second storage address to the socket; and the socket is used to receive the second storage address.

Further, the CPU runs an application program; and the socket sends the second storage address to the application program and receives the third storage address sent by the application program. The application program receives the second storage address, determines the to-be-sent data and the third storage address based on the second storage address, and sends the third storage address to the socket.

Further, the socket sends the third storage address to the TOE component. The TOE component further receives the third storage address, and obtains the to-be-sent data based on the third storage address; and a storage location of the to-be-sent data in the memory does not change before the to-be-sent data is successfully sent.

In another implementation, the network device further includes a central processing unit CPU. The CPU sends a third storage address to the TOE component, where the third storage address indicates a storage block in which the to-be-sent data determined by the CPU is stored. The TOE component further obtains the to-be-sent data based on the third storage address; and a storage location of the to-be-sent data in the memory does not change before the to-be-sent data is successfully sent.

For the beneficial effects of the second to fifth aspects and the implementations of the second to fifth aspects, reference may be made to the descriptions of the first aspect and the implementations of the first aspect.

DETAILED DESCRIPTION

The terms "first", "second", "third", "fourth", and so on are intended to distinguish between different objects but do not indicate a particular order of the objects. For example, the first storage address and the second storage address are used to distinguish between different storage addresses, rather than to specify a specific order of the different storage addresses. There is no logical or sequential dependency among the "first", the "second", and the "nth".

To make the objectives, technical solutions, and advantages clearer, the following further describes this disclosure in detail with reference to the accompanying drawings.

Figure 1:
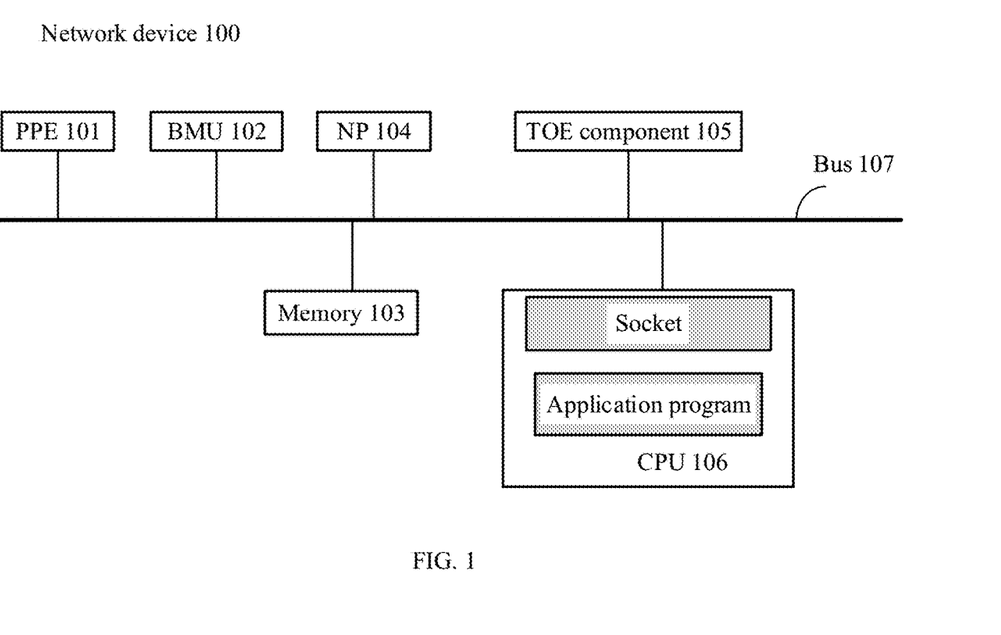
FIG. 1 is a schematic structural diagram of a network structure according to an embodiment.

An embodiment provides a network device 100. As shown in FIG. 1, the network device 100 includes a packet processing engine (PPE) 101, a buffer management unit (BMU) 102, a memory 103, a network processor (NP) 104, a TOE component 105, and a CPU 106. The PPE 101, the BMU 102, the memory 103, the NP 104, the TOE component 105, and the CPU 106 communicate with each other using a bus 107. The CPU 106 runs a socket and an application program. Functions of these components are described below in detail. The PPE 101, the BMU 102, the NP 104, and the TOE component 105 may be integrated on the same chip, or may be deployed on different chips. The network device 100 may include a gateway, a router, a bridge, a wireless access point, a switch, a firewall, and the like.

Figure 2:
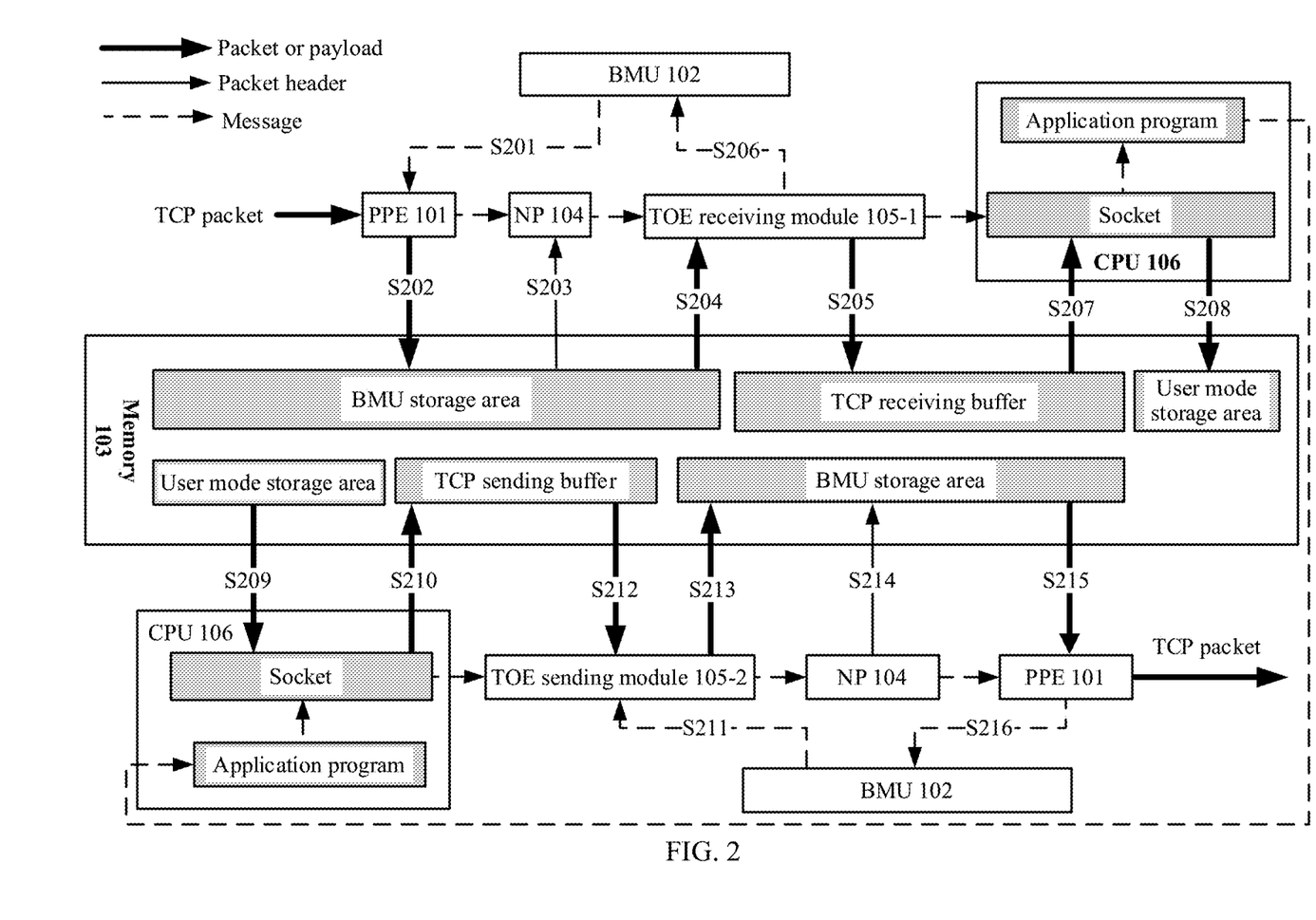
FIG. 2 is a schematic diagram of a procedure for processing a TCP packet according to an embodiment.

The network device 100 is capable of processing TCP packets. FIG. 2 is a schematic diagram of a procedure for processing a TCP packet by a network device 100 according to an embodiment. In the network device, the memory 103 is divided into a plurality of storage areas, such as a BMU storage area, a TCP receiving buffer, a user space storage area, a TCP sending buffer, for use by different components. To more clearly describe the procedure for processing TCP packets, FIG. 2 is based on an example in which the PPE 101, the BMU 102, the NP 104, and the TOE component 105 are deployed on different chips. In addition, for ease of description, the TOE component 105 in FIG. 2 is divided into a TOE receiving module 105-1 and a TOE sending module 105-2. The TOE component 105 may be divided into more modules or may not be divided into modules. In FIG. 2, the process of transmitting a TCP payload or a complete TCP packet is indicated by a thick solid line with an arrow; the process of transmitting a packet header is indicated by a thin solid line with an arrow; and the process of transmitting another control message is indicated by a dashed line with an arrow.

As shown in FIG. 2, the process of receiving the TCP packet by the network device 100 includes steps S201 to S208.

In S201, the PPE 101 requests a cache space from the BMU 102, and the BMU 102 allocates the cache space to the PPE 102. The allocated cache space is referred to as a BMU storage area in this embodiment.

The BMU storage area generally includes a plurality of storage blocks, where each storage block has a corresponding storage address, and the storage block can be found based on the storage address.

In S202, the PPE 101 receives a TCP packet A, writes the TCP packet A into the BMU storage area, and sends a first storage address to the NP 104 to notify the NP 104 that a new TCP packet needs to be processed. The first storage address is a storage address of the TCP packet A. The first storage address indicates a storage block of the TCP packet A in the BMU storage area. The TCP packet A is any TCP packet. The TCP packet includes a packet header and a payload, and the packet header includes a layer 2 header, a layer 3 header, and a TCP packet header.

In S203, the NP 104 reads a packet header A of the TCP packet A from the BMU storage area based on the first storage address, and determines, based on information in the packet header A, such as a 5-tuple (source Internet Protocol (IP) address, source port number, protocol type, destination IP address, and destination port number), and a flow table stored in the NP 104, that the TCP packet A is to be processed by the TOE component. Each entry of the flow table stores a correspondence between a 5-tuple and an operation. The NP 104 searches the flow table based on the 5-tuple in the packet header to obtain a corresponding operation, where the operation may be forwarding, sending to the CPU, sending to the TOE component, or the like. When the operation is sent to the TOE component, it indicates that the TCP packet A is to be processed by the TOE component. In S204, the NP 104 sends the first storage address to the TOE receiving module 105-1; and the TOE receiving module 105-1 obtains the first storage address, reads the TCP packet A from the BMU storage area based on the first storage address, and processes the TCP packet A.

Processing the TCP packet A includes: calculating a checksum of the TCP packet A, separating the packet header A of the TCP packet A from the TCP payload A, and storing the TCP payload A in a temporary buffer (not shown); and performing, based on the packet header A, TCP-related protocol processing such as synchronization, acknowledgement, and re-ordering.

In S205, after processing the TCP packet A, the TOE receiving module 105-1 writes the TCP payload A of the TCP packet A into the TCP receiving buffer, and sends a storage address of the TCP payload A in the TCP receiving buffer, that is, a second storage address, to the socket of the CPU.

In S206, the TOE receiving module 105-1 triggers the BMU 102 to release a storage space corresponding to the first storage address.

In S207, the socket obtains the second storage address. When an application program calls a data receiving interface of the socket, the socket reads the TCP payload A from the TCP receiving buffer based on the second storage address.

In S208, the socket writes the TCP payload A to a storage location designated by the application program in the user space storage area, where the designated storage location corresponds to a third storage address.

Further, as shown in FIG. 2, the process of sending the TCP packet by the network device 100 includes steps S209 to S216.

In S209, the application program invokes a data sending interface of the socket, and sends the third storage address to the socket.

This embodiment is described by using sending the TCP payload A as an example. Before invoking the data sending interface of the socket, the application program may process the TCP payload A, or may not process the TCP payload A.

In S210, the socket reads the TCP payload A from the user space storage area based on the third storage address, writes the TCP payload A into the TCP sending buffer, and sends a fourth storage address to the TOE sending module 105-2, where the fourth storage address indicates a storage location of the TCP payload A in the TCP sending buffer.

In S211, the TOE sending module 105-2 requests a buffer space from the BMU 102, to obtain a storage block corresponding to the fifth storage address.

In S212, the TOE sending module 105-2 reads the TCP payload A from the TCP sending buffer based on the fourth storage address, and encapsulates a TCP packet header for the TCP payload A.

There is no limitation on an execution order of steps S211 and S212.

In S213, the TOE sending module 105-2 writes the TCP payload A encapsulated with the TCP packet header into the storage block corresponding to the fifth storage address in the BMU storage area, and sends the fifth storage address to the NP 104.

In S214, the NP 104 obtains the TCP payload A encapsulated with the TCP packet header from the BMU storage area based on the fifth storage address, and adds a layer 3 header and a layer 2 header to the TCP payload A encapsulated with the TCP packet header to obtain a TCP packet B, and sends the fifth storage address to the PPE 101.

In this embodiment, the TCP packet B obtained by adding the layer 3 header and the layer 2 header to the payload A encapsulated with the TCP packet header is still stored in the storage block corresponding to the fifth storage address.

In S215, after receiving the fifth storage address sent by the NP 104, the PPE 101 reads the TCP packet B from the BMU storage area based on the fifth storage address, and then sends the TCP packet B.

In S216, after confirming that the TCP packet B is successfully sent, the PPE 101 instructs the BMU 102 to release the storage block corresponding to the fifth storage address.

In the procedure for processing the TCP packet shown in FIG. 2, the TOE receiving module 105-1 and the TOE sending module 105-2 perform TCP-related processing, and the CPU 106 needs to process only the payload of the TCP packet, thereby reducing the processing load of the CPU 106.

However, in the procedure for processing the TCP packet shown in FIG. 2, different storage areas in the memory 103 need to be allocated to different components, and each component needs to read and write the TCP payload or the complete TCP packet frequently. Therefore, the process shown in FIG. 2 has a problem of wasting memory resources and memory bandwidth.

Figure 3:
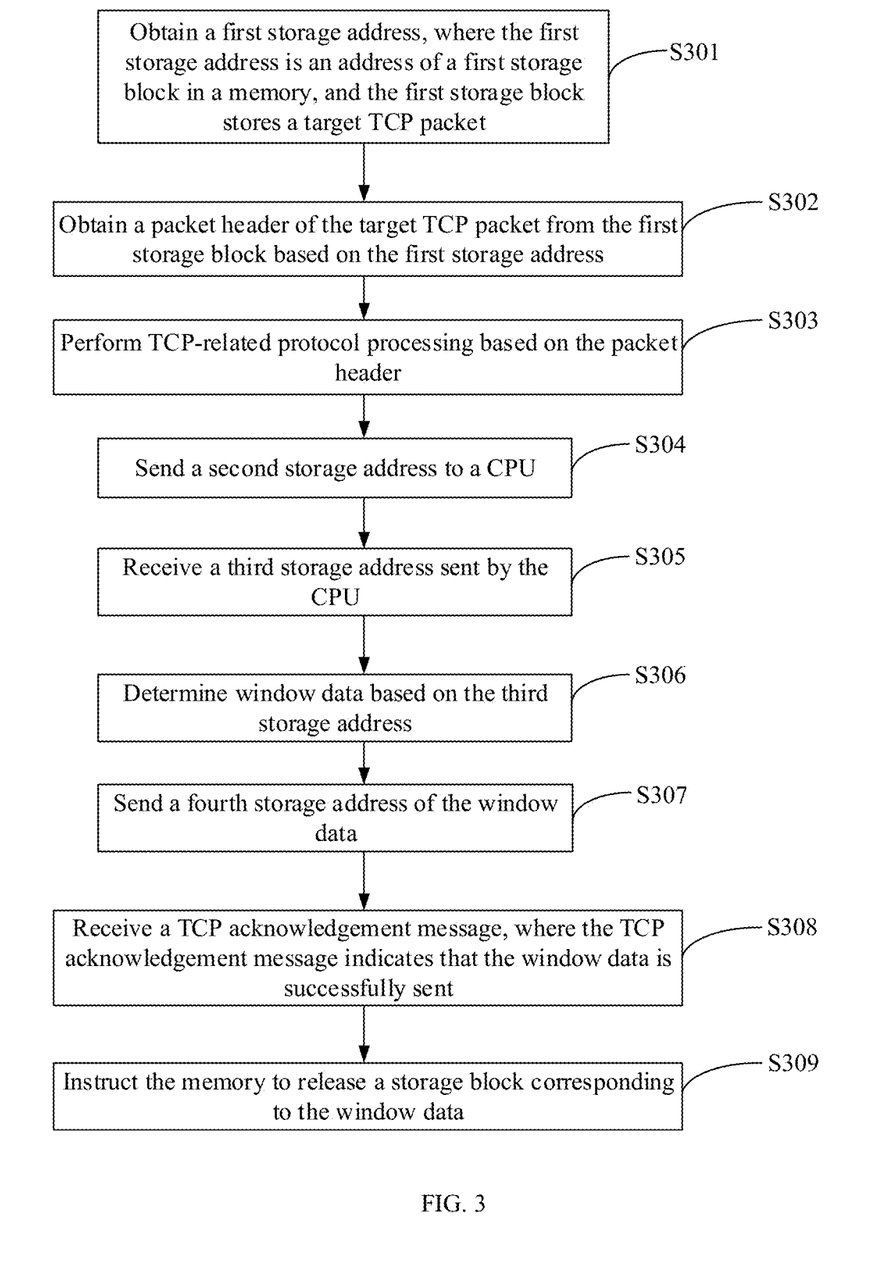
FIG. 3 is a flowchart of a TCP packet processing method according to an embodiment.

Based on the network device shown in FIG. 1, as shown in FIG. 3, a TCP packet processing method is performed by the TOE component 105. The method includes at least steps S301 to S303.

In S301, the TOE component 105 obtains a first storage address. The first storage address is an address of a first storage block in the memory, the first storage block stores a target TCP packet, and the target TCP packet includes a packet header and a TCP payload.

The target TCP packet is any TCP packet to be processed; the packet header includes a layer 2 header, a layer 3 header, and a TCP packet header; and the TCP payload is the payload of the target TCP packet. The layer 2 header includes layer 2 protocol-related information, and the layer 3 header may include layer 3 protocol-related information. The layer 2 protocol may be, for example, an Ethernet protocol, a Spanning Tree Protocol (STP), or a Link Aggregation Control Protocol (LACP), and so on. The layer 3 protocol may be, for example, IP or Internet Group Control Protocol, and so on.

Each storage block has a corresponding storage address, and the storage block can be found based on the storage address. When a TCP packet is stored in a storage block, the storage block includes a data description of the TCP packet, a packet header of the TCP packet, and a TCP payload of the TCP packet. The data description records an offset value of the TCP packet header relative to the storage block and a length of the TCP packet header, and the TCP payload can be obtained from the storage block based on the offset value and the length of the TCP packet header.

Figure 3A:
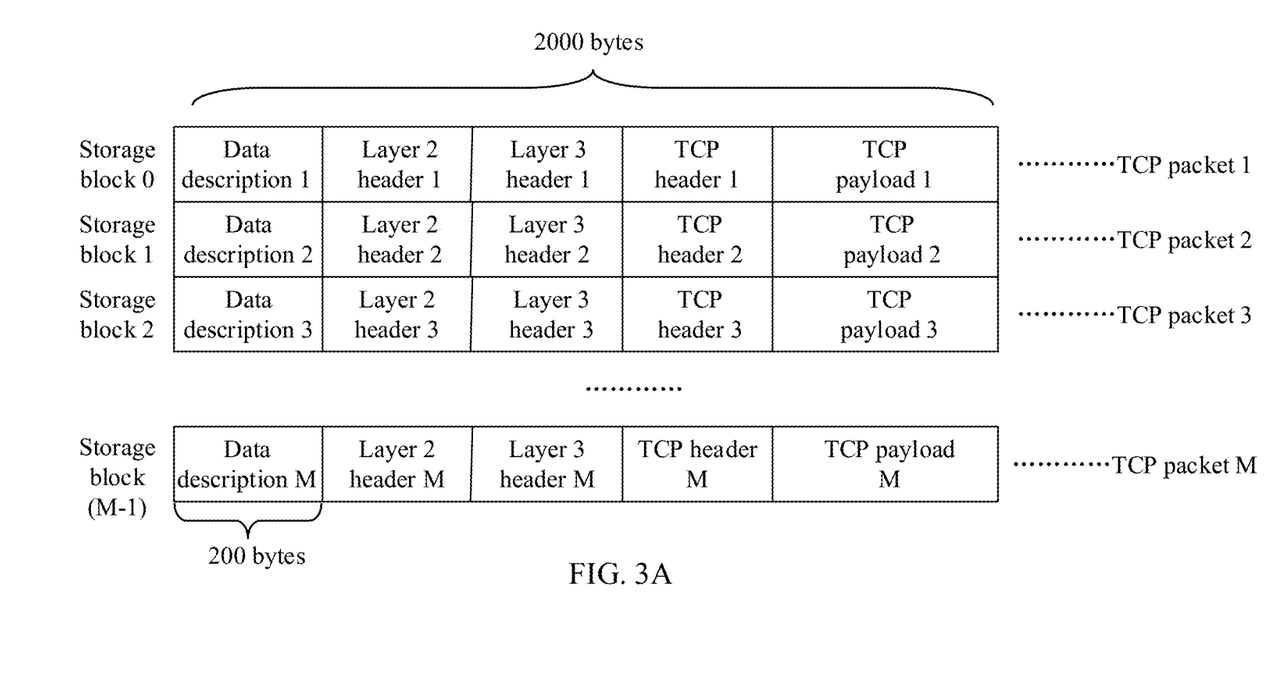
FIG. 3A is a schematic diagram of a TCP packet storage method according to an embodiment.

In an implementation, a manner of storing TCP packets in the memory 103 is shown in FIG. 3A. FIG. 3A shows M storage blocks, where each storage block stores one TCP packet. Each storage block includes a data description, a packet header, and a TCP payload. Correspondingly, the data description of a TCP packet includes an offset value, a total length of the TCP packet, and a length of the packet header of the TCP packet. The length of the packet header may be the total length of the packet header, or may include a length of a layer 2 header, a length of a layer 3 header, and a length of a TCP packet header. The offset value is an offset of the layer 2 header relative to a start byte of the storage block. For example, in FIG. 3A, the offset value is 200 bytes. When a size of the storage block is 2000 bytes and the offset value is 200, the layer 2 header can be read from the 201th byte of the storage block. In FIG. 3A, the size of each storage block is 2000 bytes, which is larger than the length of the TCP packet, and therefore, one TCP packet can be stored in one storage block. When a storage block is small, for example, 128 bytes, a single TCP packet may need to occupy a plurality of storage blocks. When a TCP packet occupies a plurality of storage blocks, the packet header of the TCP packet is not included in other storage blocks other than the first storage block.

In an implementation, the TOE component receives the first storage address sent by the PPE 101.

In S302, the TOE component 105 obtains the packet header of the target TCP packet from the first storage block based on the first storage address.

In the embodiment shown in FIG. 3, the TOE component does not need to process the TCP payload of the TCP packet when processing the TCP protocol stack. Therefore, the TOE component obtains only the packet header of the first TCP packet.

In an implementation, the TOE component obtains the packet header based on an offset address in the first storage block and a length of the packet header.

In S303, the TOE component performs TCP-related protocol processing based on the packet header.

Because TCP-related protocol processing methods and algorithms are well known to those skilled in the art, they are not further discussed.

The TOE component does not need to migrate a TCP packet or a TCP payload from one buffer to another when performing TCP-related protocol processing. That is, when the TOE component performs TCP-related protocol processing based on the packet header, the TCP payload of the target TCP packet is not read out of the first storage block, and a storage location of the target TCP packet in the memory does not change.

In this implementation, the TOE component does not need to process the TCP payload, and only needs to obtain the packet header of the TCP packet from the memory 103, so that a waste of memory bandwidth caused by frequent reading of the TCP payload from the memory can be avoided.

Further, as shown in FIG. 3, this embodiment may include step S304.

In S304, the TOE component sends a second storage address to the central processing unit CPU. The second storage address indicates a TCP payload that can be processed by the CPU.

In an implementation, the second storage address is the first storage address. In this case, the TCP payload that can be processed by the CPU is the TCP payload of the target TCP packet.

In another implementation, the second storage address indicates a second storage block, the second storage block is a start block of at least one storage block, and the at least one storage block includes the first storage block. In this case, the TCP payload that can be processed by the CPU includes payloads of a plurality of TCP packets, where the payloads of the plurality of TCP packets include the TCP payload of the target TCP packet.

Because the CPU processes only the TCP payload, after receiving the second storage address, the CPU learns that the TCP payload in the at least one storage block found based on the second storage address can be processed. Therefore, the second storage address is used to notify the CPU of the TCP payload that can be processed by the CPU.

The CPU 106 includes a socket and an application program, where the socket is used to receive the second storage address sent by the TOE component, and send the second storage address to the application program; and the application program is used to determine whether to process the TCP payload that is obtained based on the second storage address.

In an implementation, the application program in the CPU 106 obtains the TCP payload based on the second storage address and processes the TCP payload. In another implementation, the application program in the CPU 106 does not need to process the TCP payload.

In an implementation, after receiving storage addresses of a plurality of TCP packets of a data flow to which the target TCP packet belongs, the TOE component 105 generates a first storage chain based on the storage addresses of the plurality of TCP packets of a data flow to which the target TCP packet belongs, where the second storage address received by the central processing unit is an address of the first storage chain, and the address of the first storage chain is an address of a start block of the first storage chain. Further, as shown in FIG. 3, this embodiment may include step S305.

In S305, the TOE component obtains the first storage address sent by the CPU.

The third storage address indicates a storage block in which the to-be-sent data determined by the CPU is stored, so as to indicate the to-be-sent data. The to-be-sent data may include a TCP payload processed by the application program in the CPU 106, or may include a TCP payload that does not need to be processed by the application program in the CPU 106.

The to-be-sent data may include a TCP payload of at least one TCP packet. In an implementation, the to-be-sent data includes the TCP payload in S301. In another implementation, the to-be-sent data may not include the TCP payload in S301. In an implementation, the third storage address is the first storage address. In this case, the third storage address indicates only the first storage block, that is, the to-be-sent data is the TCP payload of the target TCP packet in S301.

In another implementation, the third storage address indicates a third storage block, the third storage block is a start block of at least one storage block, and the at least one storage block may or may not include the first storage block. When the third storage address indicates a plurality of storage blocks including the first storage block, and the first storage block is a start block in the plurality of storage blocks, the third storage address is the first storage address. When the third storage address indicates a plurality of storage blocks including the first storage block, and the first storage block is not a start block in the plurality of storage blocks, the third storage address different from the first storage address.

Further, the TOE component determines the to-be-sent data based on the third storage address, and a storage location of the to-be-sent data in the memory does not change before the to-be-sent data is successfully sent.

In an implementation, the procedure for processing the to-be-sent data by the TOE component includes steps S306 to S309.

In S306, the TOE component determines window data based on the third storage address, where the window data is a part or all of the to-be-sent data.

The window data refers to data that can be sent by the TOE component at a time. The procedure for determining the window data by the TOE component will be described later in detail.

In S307, the TOE component sends a fourth storage address of the window data, where the fourth storage address indicates a storage block of the window data in the memory.

A storage location of the window data in the memory does not change before the window data is successfully sent. Using the window data as an example, the TCP payload of the target TCP packet is stored in the first storage block before the TCP payload is successfully sent.

In S308, the TOE component receives a TCP acknowledgement message, where the TCP acknowledgement message indicates that the window data is successfully sent.

When the window data is a part of the to-be-sent data, the to-be-sent data needs to be sent a plurality of times so that it can be completely sent. In this case, the TOE component needs to perform S306 to S308 a plurality of times.

In S309, the TOE component instructs the memory to release a memory resource corresponding to the window data.

In an implementation, after receiving the message indicating that the window data is successfully sent, the TOE component immediately instructs the memory to release the memory resource corresponding to the window data. In another implementation, after receiving TCP acknowledgement messages corresponding to all window data included in the to-be-sent data, the TOE component instructs the memory to release the storage block corresponding to the fourth storage address. In the foregoing implementation, the storage block used by the network device to store a received TCP packet is reused, and the network device does not need to allocate a separate receiving buffer and a sending buffer to the TOE component. In addition, after sending the to-be-sent data determined by the CPU, the TOE component instructs the memory 103 to release the storage block occupied by the to-be-sent data, thereby avoiding a waste of memory resources.

Figure 4:
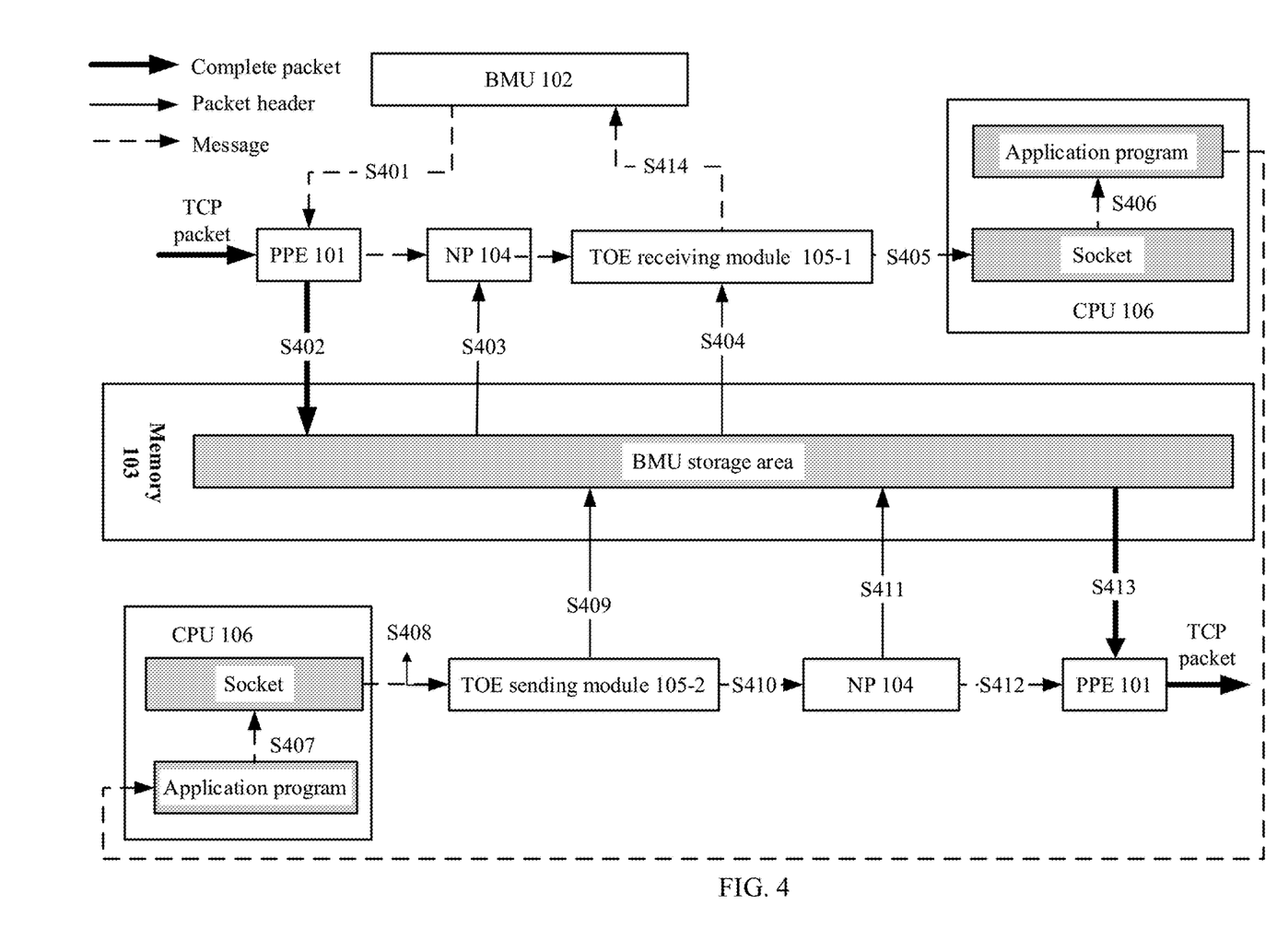
FIG. 4 is a schematic diagram of another procedure for processing a TCP packet according to an embodiment.

Based on the method shown in FIG. 3, as shown in FIG. 4, an embodiment further provides a schematic diagram of a procedure for processing a TCP packet by another network device 100. The processing procedure includes steps S401 to S413. In FIG. 4, the process of transmitting a TCP payload or a complete TCP packet is indicated by a thick solid line with an arrow; the process of transmitting a packet header is indicated by a thin solid line with an arrow; and the process of transmitting another control packet is indicated by a dashed line with an arrow. In the processing procedure in FIG. 4, corresponding storage areas in the memory 103 do not need to be allocated to different components. Mutual reference may be made to the method shown in FIG. 3 and the procedure shown in FIG. 4.

In S401, the PPE 101 requests a cache space from the BMU 102, and the BMU 102 allocates the cache space to the PPE 102 from the memory 103, where the allocated cache space is referred to as a BMU storage area in this embodiment. In this embodiment, the PPE 101, the NP 104, the TOE component 105, and the CPU 106 share the BMU storage area. The BMU storage area is further divided into a plurality of storage blocks, and each storage block corresponds to one storage address.

In an implementation, the plurality of storage blocks are of the same size. Each storage block may be capable of storing a complete TCP packet. Certainly, a size of the storage block may be set at will, and when the size of the storage block is less than that of a TCP packet, the TCP packet may be stored in a plurality of storage blocks.

In S402, the PPE 101 receives a target TCP packet, performs a TCP check on the target TCP packet, writes the target TCP packet into a first storage block in the BMU storage area after the TCP check is passed, and sends a first storage address of the first storage block to the NP 104. The target TCP packet includes a TCP packet header and a TCP payload.

The first storage block may be found based on the first storage address. The first storage block includes a data description, and the data description includes a packet header and a TCP payload that are of the target TCP packet. The data description includes an offset value, a length of the target TCP packet, and a length of the packet header; and the offset value is an offset of the packet header of the target TCP packet in the first storage block, for example, in FIG. 3A, the offset value is 200 bytes.

Figure 5:
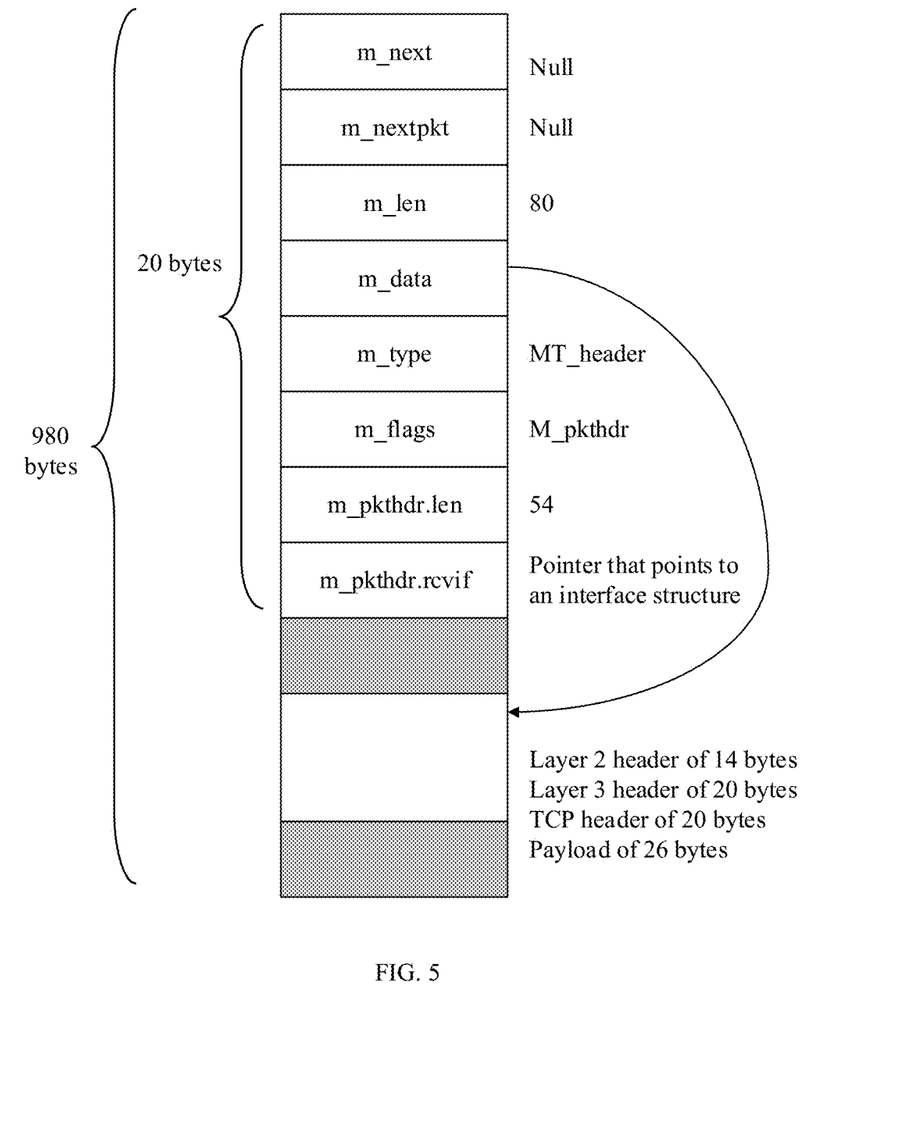
FIG. 5 is a schematic structural diagram of an mbuf according to an embodiment.

In an implementation, the PPE 101 writes the target TCP packet to the BMU storage area using the mbuf structure. In this case, one mbuf structure is stored in one storage block. FIG. 5 is a schematic diagram of an mbuf structure, or simply mbuf. A total length of mbuf in FIG. 5 is 1000 bytes, including a 20-byte header (corresponding to the data description in FIG. 3A). Therefore, one mbuf can store a maximum of 980 bytes of data. In this case, when a length of a packet is greater than 980 bytes, the packet needs to be stored in two mbufs (that is, two storage blocks). The total length of mbuf may be another length, for example, 2000 bytes. When a length of the mbuf is 2000 bytes, one mbuf stores one TCP packet. A header of the mbuf may alternatively be of another length, for example, 100 bytes. As shown in FIG. 5, the header of the mbuf may include a plurality of fields. m_next points to the next mbuf storing the same packet, and is valid only when a packet is stored in a plurality of mbufs; otherwise, m_next is null. m_nextpkt points to the first mbuf of another packet. m_len indicates a size of data stored in the mbuf, for example, 80 bytes in FIG. 5. m_data is a pointer that points to stored data. m_type indicates a type of data included in the mbuf; and in FIG. 5, m_type is MT header, indicating that the data includes a TCP packet header. m flags may be M_PKTHDR, 0, or M_EXT, where M_PKTHDR indicates that the mbuf is the first in the mbuf linked list, that is, the header of the linked list; 0 indicates that the mbuf includes only data; and M_EXT indicates that the mbuf uses an external cluster to store data of relatively large data. In addition, the packet header of the first mbuf of a packet may include m_pkthdr.len and m_pkthdr.rcvif, where m_pkthdr.len indicates a length of the packet header of the packet; and m_pkthdr.rcvif indicates a pointer that points to an interface structure. For other mbufs other than the first mbuf, m_pkthdr.len and m_pkthdr.rcvif are not needed. The mbuf shown in FIG. 5 includes a packet header; and the data portion stores a layer 2 header of 14 bytes, a layer 3 header of 20 bytes, a TCP packet header of 20 bytes, and a payload of 26 bytes, and the gray portion represents unoccupied bytes in the mbuf.

In S403, the NP 104 reads the packet header of the target TCP packet from the first storage block in the BMU storage area based on the first storage address, and determines, based on information in the packet header, that the target TCP packet needs to be processed by the TOE component 105.

In an implementation, the packet header of the target TCP packet includes a layer 2 header, a layer 3 header, and a TCP packet header. Determining, based on the information in the packet header of the target TCP packet, that the target TCP packet needs to be processed by the TOE component 105 may be determining, based on a flow table and a flow characteristic indicated by the packet header, that the target TCP packet needs to be processed by the TOE component 105. Each entry in the flow table includes a flow characteristic and a corresponding action, where the action includes forwarding to the CPU, forwarding to an outbound interface, or forwarding to the TOE component. When the flow characteristic included in the packet header corresponds to the action of forwarding to the TOE component in the flow table, the NP 104 determines that the target TCP packet needs to be processed by the TOE component 105. The flow characteristic may be a flow identifier, or at least one of a 5-tuple (source IP address, destination IP address, source port number, destination port number, and transport layer protocol).

In S404, the NP 104 sends the first storage address to the TOE component 105. The TOE component 105 receives the first storage address, obtains the packet header of the target TCP packet from the first storage block based on the first storage address, and performs TCP-related protocol processing based on the packet header. When the TOE component 105 performs TCP-related protocol processing based on the packet header, a storage location of the target TCP packet in the BMU storage area does not change, and the payload of the target TCP packet is not read out of the first storage block by the TOE component 105.

In an implementation, the NP 104 sends the first storage address to the TOE receiving module 105-1 in the TOE component 105.

In an implementation, the TCP-related protocol processing includes one or more of state transition, congestion control, re-ordering, lost packet retransmission, round-trip time (RTT) calculation, and the like. TCP-related protocol processing may be performed using any algorithm or manner well known to those skilled in the art.

In S405, the TOE component 105 sends a second storage address to the CPU 106. The second storage address indicates a TCP payload that can be processed by the CPU.

In an implementation, the TOE component 105 sends the second storage address to the socket of the CPU 106 by using the TOE receiving module 105-1.

As described above, in an implementation, the second storage address is the first storage address; in another implementation, the second storage address indicates a second storage block, the second storage block is a start block of at least one storage block, and the at least one storage block includes the first storage block.

In an implementation, the TOE component 105 records a first storage address of the target TCP packet; and after determining storage addresses of a plurality of TCP packets of a data flow to which the target TCP packet belongs, the TOE component 105 generates a first storage chain based on the storage addresses of the plurality of TCP packets, and sends an address of the first storage chain, that is, an address of a start block of the first storage chain, to the CPU. In an implementation, the plurality of TCP packets include the target TCP packet. In this implementation, the address of the first storage chain is the second storage address.

The address of the first storage chain is used by the CPU to obtain the TCP payload in each storage block included in the first storage chain.

Figure 6:
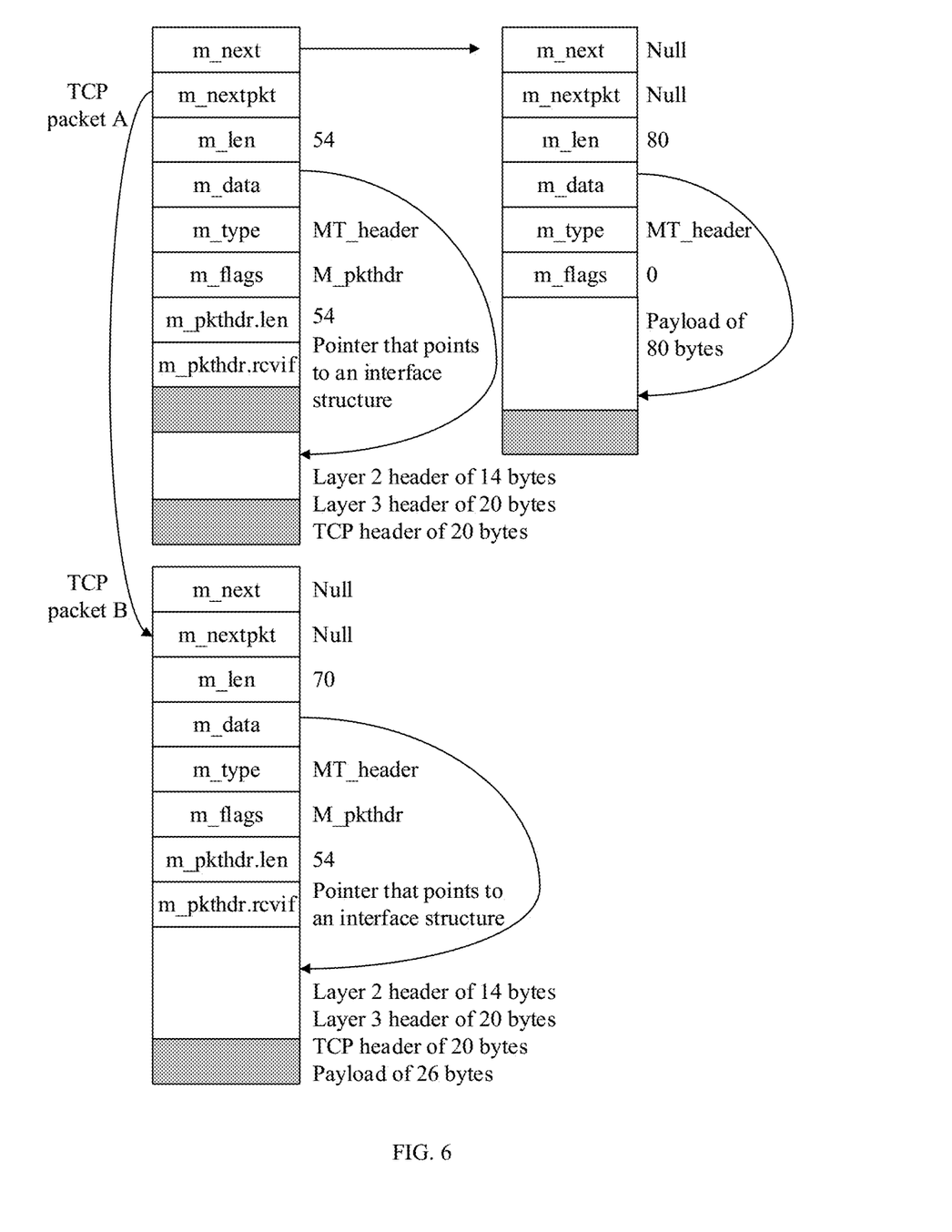
FIG. 6 is a schematic structural diagram of an mbuf chain according to an embodiment.

In an implementation, the first storage chain is an mbuf chain. FIG. 6 is a schematic structural diagram of an mbuf chain. The mbuf chain indicates two TCP packets: a TCP packet A and a TCP packet B. The TCP packet A occupies two mbufs, the TCP packet B occupies one mbuf, the m_nextpkt pointer of the TCP packet A points to the m_nextpkt of the TCP packet B, and the m_nextpkt of the TCP packet B is null.

In S406, the socket of the CPU 106 receives the second storage address, and sends the second storage address to the application program.

In an implementation, the socket receives the address of the mbuf chain through an mbuf_recv interface (an interface that is extended to be capable of receiving the address of the mbuf chain).

In S407, the application program sends a third storage address to the socket. The third storage address indicates a storage block in which the to-be-sent data determined by the application program is stored.

In an implementation, the to-be-sent data includes the TCP payload of the target TCP packet. In another implementation, the to-be-sent data does not include the TCP payload of the target TCP packet.

After receiving the second storage address, the application program may process the TCP payload indicated by the second storage address, for example, modify the content of the TCP payload, or may not process the TCP payload indicated by the second storage address.

In an implementation, when the to-be-sent data determined by the application program includes payloads of a plurality of TCP packets, or when the to-be-sent data determined by the application program is stored in a plurality of mbufs, the application program generates a second storage chain based on the to-be-sent data, invokes an mbuf send interface (an interface that is extended to be capable of sending the address of the mbuf chain) of the socket, and sends an address of the second storage chain to the socket through the mbuf send interface. The address of the second storage chain is an address of a start block of the second storage chain. The second storage chain may be the same as or different from the first storage chain. The address of the second storage chain is the third storage address.

In an implementation, S406 and S407 may be summarized as follows: The CPU 106 receives the second storage address, and determines, based on the second storage address, the third storage address of the to-be-sent data and the storage block in which the to-be-sent data is stored. In an implementation, the to-be-sent data is all or a part of the TCP payload indicated by the second storage address. Correspondingly, the third storage address and the second storage address may be the same or different. In an implementation, the to-be-sent data includes the TCP payload of the target TCP packet.

In S408, the CPU 106 sends the third storage address to the TOE component 105.

In an implementation, the socket of the CPU 106 sends the third storage address to the TOE sending module 105-2 in the TOE component 105.

In S409, the TOE component 105 modifies the TCP packet header corresponding to each TCP payload indicated by the third storage address.

In an implementation, the TOE sending module 105-2 finds each to-be-sent TCP payload based on the third storage address, and modifies the TCP packet header corresponding to the TCP payload a needed, for example, modifies a TCP port number in the TCP packet header. S409 is an optional step.

In S410, the TOE component 105 determines window data based on the third storage address, where the window data is a part or all of the to-be-sent data.

Further, the TOE component 105 sends a fourth storage address to the NP 104, where the fourth storage address indicates a storage block of the window data in the memory.

In an implementation, the TOE sending module 105-2 in the TOE component 105 determines the window data based on a congestion window of the network device 100, and a peer-end receiving window, and the to-be-sent data stored in the storage block corresponding to the third storage address. The TOE component sending module 105-2 first determines the amount of the window data based on the congestion window of the network device 100 and the peer-end receiving window, but determines, based on the amount of the window data, the window data from the to-be-sent data stored in the storage block corresponding to the third storage address. The amount of the window data may be the quantity of mbufs, or the quantity of bytes that need to be sent. The fourth storage address is determined based on the window data sent each time.

For example, the to-be-sent data are stored in five mbufs: mbuf 1, mbuf 2, mbuf 3, mbuf 4, and mbuf 5. The TOE component 105 determines that the data in three mbufs can be sent at the first time based on the congestion window of the network device 100 and a peer-end receiving window; and then generates a third storage chain based on mbuf 1, mbuf 2, and mbuf 3, and sends the address of the third storage chain (that is, the storage address of the storage block in which mbuf 1 is located) as the fourth storage address to the NP 104. When the data in the third storage chain is completely sent, the TOE component 105 may constitute the remaining two mbufs, namely, mbuf 4 and mbuf 5, into a fourth storage chain, and send an address of the fourth storage chain (namely, a storage address of a storage block in which mbuf 4 is located) as the fourth storage address to the NP 104.

In another implementation, the window data is a part of data in an mbuf, and then the TOE component 105 may split the mbuf into a plurality of mbufs. Each of the plurality of new mbufs obtained through splitting occupies one storage block, a first mbuf in the plurality of mbufs includes the window data, and the fourth storage address is a storage address of a storage block in which the first mbuf is located.

In S411, the NP 104 receives the fourth storage address, and modifies the layer 3 header and the layer 2 header in a storage block corresponding to the fourth storage address, to obtain a modified TCP packet.

There may be one or more modified TCP packets, depending on the quantity of storage blocks corresponding to the fourth storage address.

In S412, the NP 104 sends the fourth storage address to the PPE 101.

In S413, the PPE 101 receives the fourth storage address, reads the modified TCP packet from the storage block corresponding to the fourth storage address, calculates a checksum, adds the calculated checksum to the modified TCP packet, and sends the modified TCP packet.

In the foregoing process, the modified TCP packet is still stored in the storage block corresponding to the fourth storage address. In S414, the TOE component 105 receives a TCP acknowledgement message (through the TOE receiving module 105-1), where the TCP acknowledgement message is used to indicate the data received by the peer device.

The TOE component 105 confirms, based on the TCP acknowledgement message, that the window data is successfully sent, and instructs the BMU 102 to release the storage block corresponding to the fourth storage address.

S414 is an implementation of S308 and S309.

In the foregoing embodiment, no separate sending buffer and receiving buffer need to be allocated to a TCP connection, thereby saving a large quantity of storage resources. When the method shown in FIG. 2 requires that a buffer of 64 KB be allocated to each TCP connection, a memory space of 640 GB can be saved when there are 10M data flows.

Generally, the length of an Ethernet packet is 64 bytes to 1500 bytes, and the length of a packet header is 20 bytes to 64 bytes. After the PPE 101 writes a TCP packet into the BMU storage area, the NP 104 and the TOE component 105 need to read only the packet header of the TCP packet when processing the TCP packet, and do not need to frequently read the payload of the TCP packet from the BMU storage area, so that access bandwidth of the memory 103 can be reduced, and processing efficiency can be improved.

Figure 7:
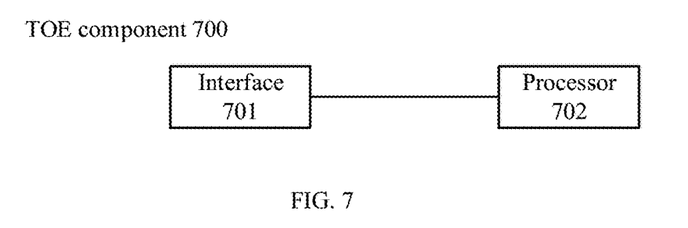
FIG. 7 is a schematic structural diagram of a TOE component according to an embodiment.

To implement the foregoing method according to the embodiments, as shown in FIG. 7, a TOE component 700 includes an interface 701 and a processor 702. The interface 701 is used by the TOE component 100 to communicate with another component of the network device.

The processor 702 obtains a first storage address through the interface 701, where the first storage address is an address of a first storage block in a memory, the first storage block stores a target TCP packet, and the target TCP packet includes a packet header and a TCP payload. The processor 702 obtains the packet header of the target TCP packet from the first storage block based on the first storage address. The processor 702 performs TCP-related protocol processing based on the packet header; and the TCP payload is not read out of the first storage block by the TOE component when the processor 702 performs TCP-related protocol processing based on the packet header.

In an implementation, the processor 702 is further configured to send a second storage address to the central processing unit CPU through the interface 701, where the second storage address is the first storage address; or the second storage address indicates a second storage block, the second storage block is a start block of at least one storage block, and the at least one storage block includes the first storage block.

In an implementation, after obtaining storage addresses of a plurality of TCP packets of a data flow to which the target TCP packet belongs, the processor 702 further generates a storage chain based on the storage addresses of the plurality of TCP packets, where the second storage address is an address of a start block of the storage chain.

In an implementation, the processor 702 further receives, through the interface 701, a third storage address sent by the CPU, where the third storage address indicates a storage block in which to-be-sent data determined by the CPU is stored, and the to-be-sent data includes the TCP payload. Further, the processor 702 determines the to-be-sent data based on the third storage address, and a storage location of the to-be-sent data in the memory does not change before the to-be-sent data is successfully sent.

In an implementation, the processor 702 further receives, through the interface 701, a third storage address sent by the central processing unit CPU, where the third storage address indicates a storage block in which the to-be-sent data determined by the CPU is stored. Further, the processor 702 determines the to-be-sent data based on the third storage address, and a storage location of the to-be-sent data in the memory does not change before the to-be-sent data is successfully sent.

A chip includes the TOE component shown in FIG. 7 and a network processor. The network processor may be the NP 104 in FIG. 1, FIG. 2, or FIG. 3. Further, the chip may include one of or both the PPE 101 and the BMU 102 in FIG. 1.

Figure 8:
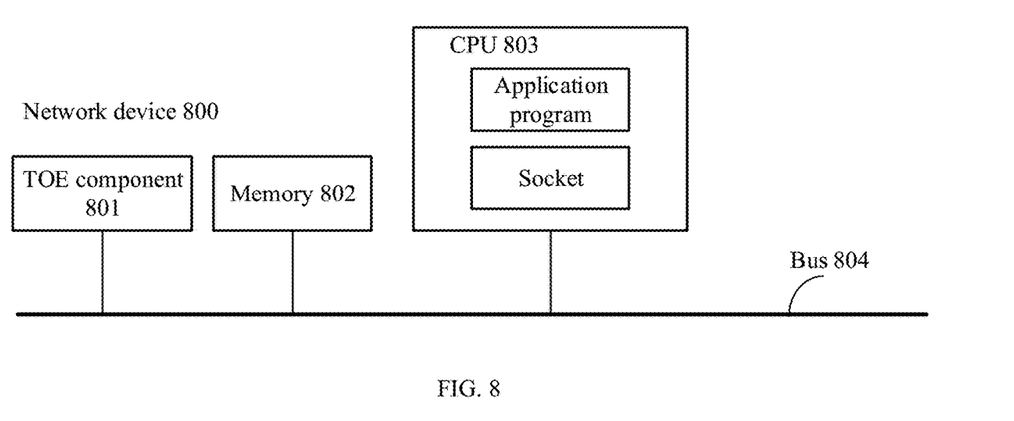
FIG. 8 is a schematic structural diagram of a network structure according to an embodiment.

As shown in FIG. 8, a network device 800 includes a TOE component 801, a memory 802, and a CPU 803, where the CPU 803 runs a socket and an application. The TOE component 801, the memory 802, and the CPU 803 communicate with each other using a bus 804. The memory 802 stores Transmission Control Protocol TCP packets.

The TOE component 801 obtains a first storage address, where the first storage address is an address of a first storage block in the memory, the first storage block stores a target TCP packet, and the target TCP packet includes a packet header and a TCP payload. The TOE component 801 performs TCP-related protocol processing based on the packet header; and the TCP payload is not read out of the first storage block by the TOE component when the TOE component 801 performs TCP-related protocol processing based on the packet header.

In an implementation, the TOE component 801 is further configured to send a second storage address to the CPU 803, where the second storage address is the first storage address; or the second storage address indicates a second storage block, the second storage block is a start block of at least one storage block, and the at least one storage block includes the first storage block. The CPU 803 receives the second storage address, and determines to-be-sent data and a third storage address based on the second storage address, where the third storage address indicates a storage block in which the to-be-sent data is stored, and the to-be-sent data includes the TCP payload.

In an implementation, after obtaining storage addresses of a plurality of TCP packets of a data flow to which the target TCP packet belongs, the TOE component 801 further generates a storage chain based on the storage addresses of the plurality of TCP packets, where the second storage address is an address of a start block of the storage chain.

In an implementation, the TOE component 801 sends the second storage address to the socket. The socket receives the second storage address, sends the second storage address to the application program, and receives the third storage address sent by the application program. The application program receives the second storage address, determines the to-be-sent data and the third storage address based on the second storage address, and sends the third storage address to the socket.

Further, the socket sends the third storage address to the TOE component 801. The TOE component 801 further receives the third storage address, and obtains the to-be-sent data based on the third storage address; and a storage location of the to-be-sent data in the memory does not change before the to-be-sent data is successfully sent.

In another implementation, the CPU 803 sends a third storage address to the TOE component, where the third storage address indicates a storage block in which the to-be-sent data determined by the CPU is stored. The TOE component 801 further obtains the to-be-sent data based on the third storage address; and the storage location of the to-be-sent data in the memory does not change before the to-be-sent data is successfully sent.

When the TOE component, the chip, and the network device process a TCP packet, only a packet header of the TCP packet needs to be read, and a payload of the TCP packet does not need to be frequently read from a memory, so that access bandwidth of the memory can be reduced, and processing efficiency can be improved.

Mutual reference may be made to the implementations provided that they do not conflict.

The foregoing descriptions are exemplary implementation manners. It should be noted that a person of ordinary skill in the art may make certain improvements and polishing without departing from the principle of the disclosure and the improvements and polishing shall fall within the protection scope of the disclosure.

What is claimed is:

1. A method implemented by a Transmission Control Protocol (TCP) offload engine (TOE) component and comprising:
    obtaining a first storage address of a first storage block in a memory, wherein the first storage block stores a target TCP packet, wherein the target TCP packet comprises a packet header and a TCP payload, and wherein the packet header and the TCP payload are stored separately in the first storage block;
    obtaining the packet header from the first storage block based on the first storage address; and
    performing TCP-related protocol processing on the packet header,
    wherein when the packet header is processed by the TOE component, the TCP payload is kept in the first storage block and no process is performed on the TCP payload.

2. The method of claim 1, further comprising sending a second storage address to a central processing unit (CPU), wherein the second storage address is the first storage address or indicates a second storage block, wherein the second storage block is a start block of at least one storage block, and wherein the at least one storage block comprises the first storage block.

3. The method of claim 2, further comprising:
    obtaining storage addresses of a plurality of TCP packets of a data flow to which the target TCP packet belongs; and
    generating a storage chain based on the storage addresses, wherein the second storage address is of a start block of the storage chain.

4. The method of claim 2, further comprising:
    receiving, from the CPU, a third storage address indicating a storage block in which to-be-sent data are stored, wherein the to-be-sent data comprise the TCP payload; and
    obtaining the to-be-sent data based on the third storage address.

5. The method of claim 1, further comprising:
    receiving, from a central processing unit CPU, a third storage address indicating a storage block in which to-be-sent data are stored; and
    obtaining the to-be-sent data based on the third storage address.

6. A Transmission Control Protocol (TCP) offload engine (TOE) component comprising:
    an interface; and
    a processor configured to:
        obtain, through the interface, a first storage address of a first storage block in a memory, wherein the first storage block stores a target TCP packet, wherein the target TCP packet comprises a packet header and a TCP payload, and wherein the packet header and the TCP payload are stored separately in the first storage block;
        obtain the packet header from the first storage block based on the first storage address; and
        perform TCP-related protocol processing on the packet header,
    wherein when the packet header is processed by the TOE component, the TCP payload is kept in the first storage block and no process is performed on the TCP payload.

7. The TOE component of claim 6, wherein the processor is further configured to send a second storage address to a central processing unit (CPU) through the interface, wherein the second storage address is the first storage address or indicates a second storage block, wherein the second storage block is a start block of at least one storage block, and wherein the at least one storage block comprises the first storage block.

8. The TOE component of claim 7, wherein the processor is further configured to:
    obtain storage addresses of a plurality of TCP packets of a data flow to which the target TCP packet belongs; and
    generate a storage chain based on the storage addresses, wherein the second storage address is of a start block of the storage chain.

9. The TOE component of claim 7, wherein the processor is further configured to:
    receive, from the CPU and through the interface, a third storage address indicating a storage block in which to-be-sent data are stored, wherein the to-be-sent data comprise the TCP payload; and
    obtain the to-be-sent data based on the third storage address.

10. The TOE component of claim 6, wherein the processor is further configured to:
    receive, from a central processing unit (CPU) and through the interface, a third storage address indicating a storage block in which to-be-sent data are stored; and
    obtain the to-be-sent data based on the third storage address.

11. The TOE component of claim 6, wherein the TOE component is a part of a chip.

12. A network device comprising:
    a memory comprising a first storage block configured to store a target Transmission Control Protocol (TCP) packet, wherein the target TCP packet comprises a packet header and a TCP payload, and wherein the packet header and the TCP payload are stored separately in the first storage block; and
    a TCP offload engine (TOE) component configured to:
        obtain a first storage address of the first storage block;
        obtain the packet header from the first storage block based on the first storage address; and
        perform TCP-related protocol processing on the packet header,
    wherein when the packet header is processed by the TOE component, the TCP payload is kept in the first storage block and no process is performed on the TCP payload.

13. The network device of claim 12, further comprising a central processing unit (CPU), wherein the TOE component is further configured to send a second storage address to the CPU, wherein the second storage address is the first storage address or indicates a second storage block, wherein the second storage block is a start block of at least one storage block, wherein the at least one storage block comprises the first storage block, and wherein the CPU is configured to:
    receive the second storage address; and determine to-be-sent data and a third storage address based on the second storage address, wherein the third storage address indicates a storage block in which the to-be-sent data are stored, and wherein the to-be-sent data indicate the TCP payload.

14. The network device of claim 13, wherein the TOE component is further configured to:

obtain storage address of a plurality of TCP packets of a data flow to which the target TCP packet belongs; and generate a storage chain based on the storage addresses, wherein the second storage address is of a start block of the storage chain.

15. The network device of claim 13, wherein the CPU is configured to run a socket, and wherein the TOE component is further configured to send the second storage address to the socket, and wherein the socket is configured to receive the second storage address.

16. The network device of claim 15, wherein the CPU is further configured to run an application program, wherein the socket is further configured to:

send the second storage address to the application program; and receive the third storage address from the application program, and wherein the application program is configured to:

receive the second storage address;

determine the to-be-sent data and the third storage address based on the second storage address; and send the third storage address to the socket.

17. The network device of claim 16, wherein the socket is further configured to send the third storage address to the TOE component, and wherein the TOE component is further configured to:

receive the third storage address; and obtain the to-be-sent data based on the third storage address, wherein a storage location of the to-be-sent data in the memory does not change before the to-be-sent data are successfully sent.

18. The network device of claim 12, further comprising a central processing unit (CPU) configured to send a third storage address to the TOE component, wherein the third storage address indicates a storage block in which to-be-sent data determined by the CPU are stored.

19. The network device of claim 18, wherein the TOE component is further configured to obtain the to-be-sent data based on the third storage address.

20. The network device of claim 19, wherein a storage location of the to-be-sent data in the memory does not change before the to-be-sent data are successfully sent.

* * * * *